United States Patent Office 3,330,784
Patented July 11, 1967

3,330,784
OPTICAL EFFECT IN ACRYLATE POLYMERS BY AN INTERNAL FOAMED STRUCTURE
Harry D. Anspon, Kansas City, Mo., assignor to General Aniline & Film Corporation, New York, N.Y., a corporation of Delaware
No Drawing. Filed Mar. 17, 1964, Ser. No. 352,633
9 Claims. (Cl. 260—2.5)

ABSTRACT OF THE DISCLOSURE

The production of opaque areas an any desired portion of a halo acrylate polymer such as methyl alpha chloracrylate by the inclusion of a small quantity of a soluble hydroxy substituted benzophenone ultra-violet light absorber, for example, 2,2′ dihydroxy 4,4′-dimethoxybenzophenone, in the monomer and subjecting the mixture to irradiation in the desired area, then curing the polymer by heating.

---

The present invention relates to acrylate polymer sheets having particular optical effects and a method of producing such. It has particular application to a process for forming methyl alpha-chloroacrylate polymer sheets which contain selected areas of opaqueness caused by the formation of fine bubbles or foams within the polymer.

It is well known in the prior art that monomers such as methyl alpha-chloroacrylate may be polymerized to produce transparent or translucent masses which have various uses. These materials have advantage of having high structural strength and toughness, being relatively light in weight, having considerably lower specific gravity then glass, etc. Moreover, they are about as transparent as good grades of glass. They can be formed into desired shapes by heating to moderate temperatures and reforming or molding and their optical properties, e.g., index of refraction, good transmission for various wave length of light, etc., are such as to make them desirable for many uses such as windows or transparent panels, signs and the like.

It is also known that polymerization of monomers of the type mentioned above can be effected in several ways. This may be done by heating alone, or by incorporating a polymerization catalyst with or without the use of heat, and/or by irradiation of the monomer using ultra-violet light. Of the methods suggested, that which involves irradiation by ultra-violet light has many advantages.

As explained in a copending application filed contemporaneously herewith, transparent mass polymers or sheets may be prepared of methyl alpha-chloroacrylate by placing the liquid monomer, with or without catalyst, preferably without, in a mold composed primarily of plate glass sheets separated by a suitable distance. When such monomeric material is subjected to ultraviolet light, the polymerization rate may be excessively high or high in spots. As a result of uneven polymerization, i.e. unduly rapid reaction, there may be produced hot spots or flaws or other defects either within the material itself or on the surface thereof, due to irregularity or excessive speed of polymerization. So, as pointed out in the copending application just mentioned, a more even polymerization conducted at a controlled rate, with consequent reduction or elimination of the flaws and defects mentioned above may be obtained by modifing the penetration of the ultra-violet radiation into the monomer. This result is obtained, according to the present invention, by incorporating in the monomer a small amount of a soluble ultra-violet light absorber. Several different materials may be used for this purpose but preferably the monomer soluble hydroxy phenolic or phenone compounds, such as various hydroxy benzophenones, benzoylresorcinol and the like. Specific compounds which are particularly suitable are 2,2′-dihydroxy-4,4′-dimethoxybenzophenone, 2, 2′,4-trihydroxy-4′- methoxybenzophenone, 2-hydroxy-4-methoxybenzophenone and the like. The materials just named are particularly effective for use in the polymerization of methyl alpha-chloroacrylate but they are not the only ones which can be so used. They can also be used in polymerization of other halo-acrylate monomers.

According to the present invention, it has been discovered that monomers of methyl alpha-chloroacrylate, in particular, may be treated in the general manner described above so as to cause fine bubbles or foam particles to be produced within the body of the resulting solid polymer. Thus, by forming a polymeric sheet in the general manner described above, followed by extended heating at elevated temperatures, a myriad of small bubbles may be formed within the sheet so as to produce an attractive white and substantially opaque material in the foamed or bubbled areas. The general appearance is as if the otherwise transparent sheet contained a white pigment. By application of localized heating, or by heating through a stencil pattern or the like, various ornamental designs, signs and bordered or decorated panels and the like, may be produced. The foamed sheets, especially those having local foamed areas only, are highly suitable for ornamental panels, sheets, trays, and the like, as well as signs, notices for display on walls and doors, and for various other uses. They may be used in windows where a part of the transparency is desirably blocked out. At the same time they may be made only partly opaque or translucent so as to be attractive by either transmitted or reflected light.

By careful manipulation the material may be so treated that the foaming or bubbling will commence in the center of the thickness of a sheet of the polymerized plastic material. By controlling the radiation in various areas, a well defined layer or mass of bubbles and foam is produced. Foaming generally starts in the center of the sheet but it may be extended from there towards the polished faces of the sheet. Where the sheet is produced or polymerized by irradiation from one side only, the foaming normally starts at or near the opposite polished surface of the sheet. On the other hand, when the sheet is produced by simultaneous irradiation from both sides, the foam is produced first in about the center of the sheet, both surfaces retaining their normal polished and transparent characteristics. These effects are apparently peculiar to sheets which are produced by irradiation and which contain ultra-violet absorbers. When the polymerization is effected by irradiation without the presence of ultra-violet absorbers particularly of the type described above, the foaming effects have not been obtained, except that in some cases a few coarse bubbles have been produced.

The nature of the ultra-violet absorber therefore, is apparently of considerable importance. Thus sheets in which are incorporated the hydroxy type ultra-violet absorbers mentioned above, such as benzoylresorcinol, 2,2′-dihydroxy-4,4′-dimethoxybenzophenone and the related materials described above, followed by subsequent heating, give rise to the uniform foaming in polymer samples during the heat treatment. On the other hand, the presence of indole type absorbers, such as 2-phenyl-indole which tends to form a red polymer sheet, or 2,3-diphenyl indole which tends to form an orange colored polymer sheet, the foaming is not produced in the same manner at all. Where foaming occurred with the latter material it was a very coarse type of foaming and was entirely unsuitable for the purposes of the present invention.

By contrast, in those sheets that were treated as described above and in which was incorporated hydroxylcontaining ultra-violet absorber, the polymerized material foamed very uniquely. The foam was started essentially in the center of thickness of the sheet when the original polymerization was effected by irradiation from both sides. As noted above, it started essentially at the unirradiated side when irradiation was carried out from one side only.

By making use of this controlled foaming effect, it has been found possible to prepare sheets possessing attractive and interesting decorative effects. In addition, such sheets are of value for the production of functional materials such as electrical insulators, heat insulators and the like. Thus, food insulators may be prepared, e.g., cartons, containers, insulated boxes, etc., which contain smooth external and internal surfaces but have finely foamed interior structures which are very effective insulators. Their smooth surfaces, inside and out, make them strong, attractive and easy to clean, unlike many insulating containers previously on the market.

When patterns are to be formed into polymer sheets, for making signs for example, the type of a sheet commonly irradiated from both sides is very useful. In such cases, the pattern appears in the center of the sheet, both faces remaining smooth and transparent. The bubbles appear as a very fine foam which, as noted above, is essentially like a white pigment in appearance. So far it has not been found feasible to produce foam patterns in sheets produced by conventional radiation, e.g., without the controlling effect of any ultra-violet light absorber. Thus in conventionally polymerized sheets of methyl alpha-chloroacrylate containing no absorber but exposed to ultra-violet light, it was found difficult to produce any kind of a pattern by allowing infra red radiation, for example, to be directed through a pattern onto the polymer sheet. This infra red radiation is a very suitable method for forming foamed or patterned sheets, according to the present invention. A relatively opaque material, such as a stencil of metal or the like, is placed in front of the sheet on which the pattern is to be produced. Thereafter an infra red light of suitable power is projected through the stencil pattern onto the polymer sheet. In conventional methyl alpha-chloroacrylate sheets produced by ultra-violet radiation but without ultra-violet light absorbers, foaming begins on or near the surface next to the light and is poorly defined. By contrast, sheets which contain the ultra-violet absorber and which, therefore, are more suitably polymerized for foam making purposes, tend to foam only in the center, assuming that the irradiation which caused polymerization was effective on both sides of the sheet. With sheets which foam in the center as just described, the extra stability of the outside layers appears to compensate for the higher temperature of the outside layer which is exposed to the infra red irradiation. The foam within the center part of the sheet then is smoothly formed and it will stand out sharply. Foaming is due probably to partial decomposition of the less irradiated parts of the polymer. Such materials may be illuminated by edge lighting or in other ways to make the most of the attractive visual effect produced.

It has been found, in connection with the present invention, that a few other stable ultra-violet light absorbers may be used for the purpose of producing plastics or polymeric sheets in which the desirable foaming effect may be brought out. Among these are such absorbers as methyl-umbelliferone and the commercial products known as Uvinul–400, Uvinul 490, as well as those phenol and phenone type absorbers mentioned above.

*Example 1*

Monomeric methyl alpha-chloroacrylate, which had been steam distilled and then kept at a temperature of —35° C. for two hours to remove frozen water, was poured into a mold composed of two glass plates 30 x 30 inches each and spaced ⅛ inch apart. The mold thus formed was provided with a suitable peripheral edge seal. To the monomer was added 0.05% of a silicone resin, DC–550 a Dow Corning product, to facilitate separating the polymer from the mold, and also 0.05% by weight, based on the total composition, of 2,2'-dihydroxy 4,4'-dimethoxybenzophenone. These materials were incorporated prior to filling the mold. After filling, the mold was exposed to irradiation from 6 Westinghouse fluorescent sunlamps, 40 watts at 110 volts. These lamps were placed about 1 foot away from the molds, exposure being only on one side in this case. After irradiation for 142 hours, the polymerization was complete. The mold thereafter was placed in an oven and cured for 24 hours at 120° C.

After removal from the oven, the finished polymer sheet was removed by separating the plates and was examined under polarized light. There were no apparent visual strains in the sheet and no star patterns evident as is often the case with many sheets of the alpha haloacrylate type polymerized by ultra-violet light.

A sample of the sheet produced above was heated for six separate half-hour periods at a temperature of 160° C. During the sixth half-hour period many fine bubbles barely visible to the naked eye were formed. Thereafter the sheets were heated for 165 minutes at 160° C. During this time, foaming of the sheets continued at an accelerated rate. At the end of the 165-minute period, the sheet had expanded to about twice its original volume. The expanded polymer thus produced contained a very fine and dense bubble structure. It contained apparently many thousands of very fine bubbles not quite visible individually to the naked eye but easily visible with the aid of a hand lens of about six power. The bubbles were so fine and so numerous that they caused the sheet to appear white and quite opaque, as if it contained a white pigment. Nevertheless the finely bubbled sheet still transmitted a large part of incident light falling upon it. That is to say, it retained some translucency.

It has not been found possible as noted above, to produce many bubbles or bubbles as fine as those found in this sheet, when employing polymeric sheets produced by ultra-violet irradiation but containing no ultra-violet absorber. Many polymers do foam under similar conditions but they have not produced the fine foam of tiny bubbles in vast numbers and all very small which gives the attractive appearance obtained in this case.

*Example 2*

Example 1 was repeated except that the ultra-violet absorber was omitted from the polymer. As previously indicated no attractive foaming was produced, even after extended heating. Apparently the use of the ultra-violet absorber makes the polymerization so regular but graded through the sheet that decomposition induced by heat is more regular also. The result is formation of a myriad of very fine bubbles rather than the spotty formation of large bubbles. The latter phenomenon apparently occurs when polymers produced without the ultra-violet light absorbers are treated by heat in similar fashion.

As intimated above, the most desirable type of foaming, for most purposes is that obtained when a polymer sheet or other mass has been irradiated from both sides. This causes formation of the bubbles at or around the middle of the thickness of the sheet or mass leaving both surfaces smooth and clear. Sheets and other masses so treated are also subject to less physical deformation on standing or further processing. In particular, sheets retain dimensional stability much better than those which are irradiated only from one side and which, due to the expansion inherent in the foaming tend to distort and become nonplanar. However, for particular effects and where curvature is desired, it is entirely feasible to produce the foam in polymer sheets which are irradiated from one side only to cause the initial polymerization.

Depending on the extent to which the foaming is desired, the dimensional stability in the sheet may remain good or it may be considerably distorted. Where foaming or expansion is to be carried out to such an extent as to produce insulators, for example, as in the case of the food containers mentioned above, it is obvious that care needs to be taken to avoid undue distortion. For this purpose, the sheets may be retained structurally between opposite supporting plates of glass or the like while the foam producing radiation or heat is transmitted through an appropriate shield, stencil or pattern if a pattern effect is desired.

It will be obvious that this invention has many applications and can be used for many purposes. The novel products of the process are deemed to be important aspects of the invention, along with the process for their production. It is intended by the claims which follow to cover the most obvious and usual applications of this material and all such variations thereof as will suggest themselves to those skilled in the art.

What is claimed is:

1. A solid mass of halo-acrylate resin comprising at least one transparent surface layer or facing, and an internal foamed structure comprising a myriad of very small bubbles of such size, number and intensity as to give a white opaque pigment visual effect.

2. A mass according to claim 1 in which both surfaces are smooth and transparent and the foaming is around the center of thickness.

3. A mass according to claim 1 wherein foaming is so extensive as to make the mass a substantial heat insulator.

4. Method of producing an ornamental plastic sheet or mass, which comprises adding a hydroxy substituted benzophenone ultra-violet light absorber composition to a halo-acrylate monomer capable of dissolving said absorber, in proportions of 0.001 to 0.1% by weight, thereafter polymerizing the monomer by use of ultra-violet light, and subsequently heating the polymer mass to produce a myriad of fine bubbles within the mass and thereby to create the visual effect of a white pigment within the otherwise transparent polymer.

5. Process according to claim 4 wherein the irradiation by ultra-violet light is accomplished through both sides of the sheet or mass and wherein the foamed area is approximately within the center part of the sheet or mass.

6. An ultra-violet radiation polymerized plastic foam material comprising a mass of methyl alpha-chloroacrylate polymer which contains a hydroxy substituted benzophenone absorber for ultra-violet radiation and which is partially decomposed in at least selected regions within its mass to contain a myriad of fine bubbles.

7. A foam material according to claim 6 wherein the bubble region defines character indicia.

8. A foam material according to claim 6 wherein the bubble region is so extensive as to make the polymer a substantial heat insulator.

9. An insulated container comprising a main structure of an alpha halo-acrylate polymer expanded into a foamed mass having substantial heat insulating properties and having smooth transparent inner and outer wall surface layers.

References Cited

UNITED STATES PATENTS 2,684,341  7/1964  Anspon _____ 260—2.5

SAMUEL H. BLECH, *Primary Examiner.*

R. B. TURER, *Assistant Examiner.*